United States Patent [19]

Wilson

[11] 4,154,720

[45] May 15, 1979

[54] RUBBER COMPOSITIONS CONTAINING ZINC TRIMELLITATE

[75] Inventor: Alfred P. Wilson, St. Charles, Ill.

[73] Assignee: Standard Oil Company (Indiana), Chicago, Ill.

[21] Appl. No.: 927,989

[22] Filed: Jul. 26, 1978

[51] Int. Cl.² ............................................. C08K 5/09
[52] U.S. Cl. ............................ 260/45.75 W; 260/782
[58] Field of Search ...................... 260/45.75 W, 782

[56] References Cited

U.S. PATENT DOCUMENTS

| | | | |
|---|---|---|---|
| 2,034,889 | 3/1936 | Williams | 260/782 |
| 2,058,840 | 10/1936 | Thies | 260/782 |
| 2,570,632 | 10/1951 | Barton | 260/782 |
| 3,687,881 | 8/1972 | Bowman | 260/45.75 W |

OTHER PUBLICATIONS

Rubber Chemistry and Technology—vol. 50, No. 3, Jul.-Aug., 1977, pp. 570-600.

*Primary Examiner*—V. P. Hoke
*Attorney, Agent, or Firm*—William C. Clarke; Arthur G. Gilkes; William T. McClain

[57] ABSTRACT

Rubber compositions comprising zinc trimellitate and a rubber selected from the group consisting of styrene-butadiene rubber (SBR), nitrile rubber, natural rubber, butyl rubber, polybutadiene rubber and isoprene rubber, the said rubber being sulfur-cured with zinc oxide as an activator.

10 Claims, No Drawings

RUBBER COMPOSITIONS CONTAINING ZINC TRIMELLITATE

BACKGROUND OF THE INVENTION

The field of this invention relates to rubber compositions containing zinc trimellitate with improved scorch control and an improved control of cure rate.

When sulfur is the vulcanizing agent of a rubber composition, accelerators are used to increase the rate of cure and to improve the physical properties and the age resistance of the vulcanized rubber. With most accelerators small amounts of zinc oxide and fatty acid are required to achieve the best quality in the vulcanized rubber. Hence it is almost universal practice to include both in rubbers vulcanized with sulfur and accelerators. Sometimes further activation and improved properties can be obtained by the use of additional activators such as litharge, magnesium oxide, amines, amine soaps, etc.

Quite often, a single accelerator will give a slow rate of cure but the rate can be increased by the use of secondary accelerators. The combination of accelerator and an activator, such as zinc oxide, to obtain a faster cure rate is more economical than a higher concentration of the accelerator. Use of activators can be accompanied by serious material losses in processing because of "scorch" (premature vulcanization during compounding) wherein the rubbers in process suddenly or gradually become tough and unworkable. This phenomenon described as scorching, precuring or burning may be attributed to (1) faulty compound design, (2) excessive processing temperatures, (3) improper or insufficient cooling before storage between processing stages, or (4) faulty processing equipment. Scorch is one of the rubber industry's major problems. Retarders extend scorch safety but have disadvantages of unpredictable influences on state of cure and undesirable side effects such as staining and porosity.

The prior art discloses a number of vulcanization additives giving rubber products with reduced tendency to scorch. U.S. Pat. No. 2,554,181 teaches cyclohexyldithiocarbamates prepared from cyclohexylamine and carbon disulfide are powerful but nonscorching accelerators for vulcanization of chloroprene rubber. U.S. Pat. No. 2,567,853 teaches the retarding of the vulcanization of rubber to prevent scorch by the addition of the organic hydrogen sulfate such as zinc lauryl sulfate, zinc oleyl sulfate or aluminum oleyl sulfate in the presence of zinc oxide and stearic acid in the vulcanization recipe. U.S. Pat. No. 2,561,524 teaches the use of bicyclo-[2.2.1]-5-heptene-2,3-dicarboxylic anhydride or its derivatives to reduce scorching in the presence of certain accelerators. German Offen. No. 2,403,208 teaches that premature vulcanization of natural rubber was inhibited by thiophosphoramides to increase Mooney Scorch time from 11 minutes to 18 minutes. U.S. Pat. No. 3,850,845 teaches metal paste co-dispersions of magnesium oxide and zinc oxide as curing or vulcanizing agents for halogen-containing polymers such as neoprene. Japanese Kokaii No. 75,128,732 teaches that before curing with metal oxides and thioureas, neoprene rubbers were mixed with cyclohexyl dimethylthiocarbamyl disulfide to inhibit prevulcanization in a composition containing zinc oxide and stearic acid, obtaining a Mooney Scorch test value of 1 minute 55 seconds. U.S. Pat. No. 3,544,531 teaches a method of vulcanizing rubber with dialkyloxyphosphinothioyl amino disulfides as accelerators and vulcanizing agents in typical formulations containing zinc oxide and/or stearic acid.

Accordingly, it is well-known in the prior art to reduce scorching with a number of scorch delay compounds with many different accelerators used with zinc oxide and/or stearic acid. In general, it has been taught in the prior art that any alkaline material, either added as such or present in the compounded rubber for another purpose as is the case of byproduct whitings or high pH furnace blacks, has an activating effect on rubbers in which they are present. Conversely, materials of an acidic nature retard the vulcanizing rate in compounded rubber where they are present. Stearic acid itself, if present in excessive quantities, exerts a retarding action.

Accordingly, it is well-known in the prior art to vulcanize rubber with sulfur and zinc oxide and/or stearic acid in conjunction with many other additives fulfilling functions as accelerators, activators, inhibitors, etc. but vulcanization of rubber with sulfur, zinc oxide and/or stearic acid in conjunction with zinc trimellitate as a scorch control agent and cure rate control agent has not been known.

The new rubber compositions comprising zinc trimellitate and a rubber selected from the group consisting of styrene-butadiene rubber (SBR), nitrile rubber, natural rubber, butyl rubber, polybutadiene rubber and isoprene, the said rubber being sulfur-cured with zinc oxide as an activator, demonstrate not only improved scorch control with increased control of scorch time but also improved control of cure rate.

SUMMARY OF THE INVENTION

Rubber compositions comprising zinc trimellitate and a rubber selected from the group consisting of styrene-butadiene rubber (SBR), nitrile rubber, natural rubber, butyl rubber, polybutadiene rubber and isoprene rubber, the said rubber being sulfur cured with zinc oxide as an activator; and the curing process for so curing the above composition.

DETAILED DESCRIPTION OF THE INVENTION

The composition of this invention is a unique rubber composition comprising a sulfur-curable rubber, zinc trimellitate and zinc oxide wherein the zinc trimellitate acts in a surprising and synergistic manner with the zinc oxide to improve control of scorch and to improve control of cure rate of the rubber.

The control of scorch during compounding and control of the rate of cure of the rubber composition is due primarily to the use of particular ratios of zinc trimellitate to zinc oxide in the rubber compositions which are employed therein and the process conditions which are used.

The sulfur vulcanizable rubber compositions comprise (1) a sulfur vulcanizable rubber, (2) sulfur, (3) zinc oxide, (4) zinc trimellitate, and (5) optionally, other accelerators, activators, inhibitors, retarders, and other additives, including carbon black. The rather complex system represents a unique balance of cure factors which yields good scorch contrl at processing temperatures and vulcanizates having good physical properties. The compositions are particularly useful to prepare particles that require moderately long processing and shaping operations and/or are subject to thermal aging conditions. Such articles would be tires, belting, hose, gasketing, seals and the like.

The sulfur vulcanizable rubber contains from about 0.5 percent to about 50 percent by weight of olefinic (C=C) unsaturation based on the weight of the polymer. The olefinic group can be in the polymer main chain (backbone) or in the pendant (side-chain) groups, or both. Examples of such polymers are high unsaturation rubbers such as natural rubber, cis-polyisoprene, cis-polybutadiene (CB), emulsion polybutadiene, butadiene-acrylonitrile (NBR) rubbers, isoprene-acrylonitrile rubbers, polychloroprene, polypentenomer rubbers, butadiene-styrene rubbers (SBR), isoprene-styrene rubbers, and the like; and low unsaturation polymers such as isoprene-isobutylene (butyl) rubbers, copolymers of conjugated dienes with lower alkyl and alkoxy acrylates like ethyl acrylate, butyl acrylate, methoxyethyl acrylate, and the like; polyether, terpolymers containing up to 20 percent by weight of glycidyl acrylate, allyl glycidyl ether, and the like; and ethylene-propylenediene polymers (EPDM) containing from about 0.5 percent to about 20 percent by weight of a diene monomer where the diene can be conjugated as in butadiene, 1,3-pentadiene, and the like; non-conjugated as in 1,4-pentadiene, 1,4-hexadiene, and the like; cyclic dienes as in cyclopentadiene, dicyclopentadiene, and the like; an alkenyl norbornene such as 5-ethylidiene-2-norbornene, 2-isopropenyl-5-norbornene, and the like; and others such as 3-ethyl-bicyclonodiene, methyltetrahydroindene, and 3-methyl-tricyclo-(5,2,1,0,2,6)- 3,8-decadiene.

Although this invention is primarily directed to the use of a sulfur vulcanizable rubber, blends of two or more sulfur vulcanizable rubbers can be employed. For example, the rubber can be a polymer blend of styrene-butadiene rubber and polybutadiene rubber, or a terpolymer blend of natural or polyisoprene rubber with polybutadiene and poly (butadiene-styrene) rubber. If desired, saturated ethylenepropylene rubbers can be used with unsaturated rubber.

Sulfur can be employed in a concentration from about 0.1 part to 2.0 parts by weight per 100 parts by weight of the sulfur-vulcanizable rubber. Use of the sulfur is necessary to obtain the high state of cure and good fatigue life of the composition. However, use of levels significantly higher than those designated usually results in inferior heat aged properties.

The total concentration, zinc oxide and zinc trimellitate can range from about 2 parts to 10 parts by weight per 100 parts by weight of the vulcanizable rubber.

Zinc trimellitate can comprise from 5 to 95 percent by weight of the total zinc oxide and zinc trimellitate concentration or the weight ratio of zinc trimllitate to zinc oxide is within the range of 1:19 to 19:1. Preferred range is from about 25 to 75 percent by weight of zinc oxide wherein the weight ratio of zinc trimellitate to zinc oxide is 1:3 to 3:1.

Typically, the rubber composition also comprises quantities of additives as antioxidants and other compounding ingredients which can be present in very substantial quantities such as carbon black, softeners and pigments.

In general, this invention is applicable to any sulfur vulcanizable rubber. Although the unsaturation may be small, any of the sulfur-vulcanizable rubbers, as listed heretofore, can be used in the practice of this invention. The following table illustrates a typical base formulation used.

|  | Parts By Weight |  |
|---|---|---|
| Styrene Butadiene Rubber | 100 |  |
| Carbon Black | 50 |  |
| (Philips 1605 Masterbatch) |  | 150 |
| Stearic Acid |  | 1 |
| Zinc Oxide |  | 5 |
| Antioxidant |  | 1.5 |
| Sulfur |  | 1.5 |
| Accelerator |  | 1.5 |

The uncured rubber compositions are tested for processing safety or scorch delay at 320° F. by means of the Monsanto Oscillating Disk Rheometer described by Decker, Wise and Guerry in Rubber World, December 1962, page 68.

The uncured rubber compositions were so compounded by being added together on a mill and masticated for a period of time. In the case of SBR, the procedure was: add masterbatch rubber on the cool mill (temperature approximately 90° F.) and mill until smooth, add stearic acid and mill until smooth, add antioxidant and mill until smooth, add zinc oxide and mill until smooth, add sulfur and accelerator and mill for one minute, then sheet off. The zinc trimellitate was added in portions with the zinc oxide.

The stocks so compounded were evaluated for zinc activity with the above Monsanto Rheometer. The evaluations were made at four temperatures: 270° F., 290° F., 320° F., and 330° F. The results indicated that zinc trimellitate acted synergistically with zinc oxide as an ultra accelerator but that the ability to retard scorch time depended upon the accelerator. The time to reach maximum torque was taken as the time to reach optimum cure. The processing safety was also evaluated by means of the rheometer. The time recorded was the time to reach two rheometer units above the minimum reading. Also determined was the amount of force in pounds per square inch (psi) to elongate each sample 300% designated as 300% Modulus, the amount of force in psi required to break the sample, designated as Tensile Strength, and the amount of elongation from initial size to break designated as Ultimate Elongation.

In summary, the invention relates to a composition comprising a sulfur vulcanizable rubber, sulfur, zinc oxide as an activator, and at least a sufficient amount of zinc trimellitate to improve control of scorch and the cure rate and to the said composition wherein the said composition is vulcanized by a vulcanization process which comprises mixing and masticating said composition on a mill for a time sufficient to achieve smoothness, adding the zinc oxide and zinc trimellitate and curing the resulting composition at a temperature within the range of from about 250° F. to 350° F. for a period sufficient for a complete cure and to obtain a vulcanized composition.

In order to facilitate a clear understanding of this invention, the zinc trimellitate and rubber compositions comprising a rubber sulfur-cured with zinc oxide as an activator and at least a sufficient amount of zinc trimellitate to control scorch and the cure rate, the following specific embodiments are described in detail. These embodiments and examples are presented for purposes of illustration only and are not intended to limit the scope of the invention.

EXAMPLE I

Masterbatch rubber compositions containing 50 parts of carbon black per 100 parts of styrene-butadiene rubber (SBR) were mixed with various rubber compounding ingredients.

The SBR masterbatch was mixed on a two-roll mill following a standard mixing procedure with the curative ingredients being added. Initially the masterbatch was masticated on the mill with stearic acid, zinc oxide and the antioxidant for 17 minutes. The accelerator and sulfur were then added to the composition and mixed for one minute. The composition was then sheeted off. The following recipes were evaluated (in parts by weight).

Table I

| | Masterbatch Rubber Formulations Parts by Weight | | | | | | |
|---|---|---|---|---|---|---|---|
| Sample | 71-1 | 71-2 | 71-3 | 71-4 | 70-1 | 70-2 | 70-3 |
| SBR Rubber (Phillips 1605) | 150 | 150 | 150 | 150 | 150 | 150 | 150 |
| Stearic Acid | 2 | 2 | 2 | 2 | — | — | 2 |
| Zinc Oxide (Actox 14) (ZnO) | 5 | 1.25 | 2.5 | 3.75 | 5 | — | — |
| Antioxidant (Agerite Stalite) | 1.5 | 1.5 | 1.5 | 1.5 | 1.5 | 1.5 | 1.5 |
| Sulfur | 2 | 2 | 2 | 2 | 2 | 2 | 2 |
| Accelerator (Amax) | 1.5 | 1.5 | 1.5 | 1.5 | 1.5 | 1.5 | 1.5 |
| Zinc Trimellitate (ZnTm) | — | 3.75 | 2.5 | 1.25 | — | 5 | 2.5 |
| Ratio ZnO:ZnTm | 5:0 | 1.25:3.75 | 2.5:2.5 | 3.75:1.25 | 5:0 | 0:5 | 0:2.5 |

Actox 14 is zinc oxide and a product of New Jersey Zinc Company, Bethlehem, Pa. Agerite Stalite is a liquid alkylated diphenyl amine with a $C_8H_{17}$ alkyl moiety. Amax is N-oxydiethylene benzothiazole 2-sulfenamide. Agerite Stalite and Amax are products of R. T. Vanderbilt Company, Inc. of Norwalk, Conn.

The milled samples were evaluated in a Monsanto Oscillating Rheometer 100 at the indicated temperatures. The samples were cooled and then heated to 320° F. for rheometer testing. The time in minutes required for the viscosity of the stock to increase two units above the minimum viscosity was determined. This was determined as the Scorch Resistance in minutes. The time required to reach 90% of total cure was a measure of the rate of cure. The cross-link efficiency was measured by maximum rheometer torque at total cure. The results are shown in Table II.

Table II

| | Cure Time and Scorch Resistance Effect of Zinc Trimellitate | | | | | | |
|---|---|---|---|---|---|---|---|
| Sample | 71-1 | 71-2 | 71-3 | 71-4 | 70-1 | 70-2 | 70-3 |
| Cure Temperature, °F. | 320 | 320 | 320 | 320 | 320 | 320 | 320 |
| Time to 90% Cure -Minutes | 14.5 | 12.5 | 15.5 | 13.5 | 15.0 | 36.0 | 46.0 |
| Time To Total Cure - Minutes | 48 | 32 | 45 | 30 | 35 | 70+ | 70+ |
| Scorch Resistance - Minutes/2 Units | 6.5 | 5.0 | 6.8 | 5.75 | 6.8 | 5.5 | 6.0 |
| lbs. Torque at Total Cure | 99 | 100 | 100 | 105+ | 99 | 74 | 67 |

Sample 71-1 was a control sample. It demonstrates the typical scorch time and curing time of a zinc oxide system with stearic acid and Amax accelerator. Samples 71-2, 71-3 and 71-4 are novel compositions of this invention. Sample 70-1 shows the effect of removing stearic acid as an actuator from the control sample. Samples 70-2 and 70-3 show the effect of zinc trimellitate without the presence of zinc oxide. The control of cure time and scorch resistance with equal or higher torque resistance of samples 71-2, 71-3 and 71-4 demonstrates the novel qualities of this invention.

The samples so compounded and evaluated on the Monsanto Rheometer 100 were evaluated as to 300% modulus, tensile strength and present elongation as shown in Table III. The tensile data were obtained from 20 mil molded slabs. The slabs were molded at 340° F. for 20 minutes.

Table III

| | SBR Cured Properties Effect of Zinc Trimellitate | | | | | | |
|---|---|---|---|---|---|---|---|
| Sample | 71-1 | 71-2 | 71-3 | 71-4 | 70-1 | 70-2 | 70-3 |
| Modulus of Elasticity at 300% Elongation, lbs/in$^2$ | 2,363 | 2,023 | 2,310 | 2,347 | 2,222 | 1,045 | 1,315 |
| Tensile Strength at Break, lbs/in$^3$ | 2,545 | 2,483 | 2,445 | 2,405 | 2,636 | 1,845 | 2,428 |
| Ultimate Elongation, Percent | 325 | 360 | 320 | 325 | 380 | 500 | 500 |

The samples of the instant invention have hysteresis properties comparable to the control sample.

Samples 70-1 and 70-2 were compounded without stearic acid to evaluate the effect of omitting stearic acid from the compounds since zinc trimellitate has a residual acidity. When stearic acid was removed from the formulation containing zinc trimellitate, the modulus, tensile strength and scorch time were reduced compared with a compound with zinc oxide and no stearic acid. Elongation was increased. The rheometer data indicate a retardation of maximum curve even though the scorch resistance was reduced. When zinc trimellitate was reduced 50% but the formulation contained stearic acid as in Sample 70-3 the modulus and tensile strength increased in comparison with Sample 70-2 which contained zinc trimellitate but no stearic acid.

EXAMPLE II

The procedure of Example I was repeated using stocks containing amounts of zinc octoate, zinc octoate with zinc oxide and zinc octoate with zinc trimellitate. The formulations were as in Table III.

Table III

| | Masterbatch Rubber Formations | | |
|---|---|---|---|
| | Parts by Weight | | |
| Sample | 72-1 | 72-2 | 72-3 |
| SBR Rubber (Phillips 1605) | 150 | 150 | 150 |
| Stearic Acid | 2 | 2 | 2 |
| Zinc Oxide (Acetox 14) (ZnO) | — | 2.5 | — |
| Antioxidant (Agerite Stalite) | 1.5 | 1.5 | 1.5 |
| Sulfur | 2 | 2 | 2 |
| Accelerator (Amax) | 1.5 | 1.5 | 1.5 |
| Zinc Octoate | 2.5 | 2.5 | 2.5 |
| Zinc Trimellitate (ZnTm) | 2.5 | — | — |
| Ratio ZnO:ZnTm | 0:2.5 | 2.5:0 | — |

Cure time and scorch resistance are shown in Table IV.

Table IV

Cure Time and Scorch Resistance
Effect of Zinc Trimellitate, Zinc Octoate,
Zinc Oxide, Zinc Octoate, and Zinc Octoate

| Sample | 72-1 | 72-2 | 72-3 |
|---|---|---|---|
| Cure Temperature, °F. | 320 | 320 | 320 |
| Time to 90% Cure — Minutes | 9.8 | 17.3 | 11.5 |
| Time To Total Cure — Minutes | 23.0 | 58.0 | 18.75 |
| Scorch Resistance — Minutes/2 Units | 5.9 | 6.5 | 6.5 |
| lbs Torque at Total Cure | 73.5 | 91.6 | 70.0 |

The zinc trimellitate-zinc octoate system reduced scorch time and cure time relative to a zinc oxide-zinc octoate system and a zinc octoate system. However, lbs. torque at total cure of the zinc trimellitate-zinc octoate system was less than the zinc octoate system.

The samples were evaluated as to 300% modulus, tensile strength and percent elongation as shown in Table V.

Table V

SBR Cured Properties
Effect of Zinc Trimellitate

| Sample | 72-1 | 72-2 | 72-3 |
|---|---|---|---|
| Modulus of Elasticity at 300% Elongation lbs/in$^2$ | 1,158 | 2,183 | 1,460 |
| Tensile Strength at Break, lbs/in$^3$ | 2,240 | 2,656 | 2,593 |
| Ultimate Elongation, Percent | 530 | 350 | 530 |

The zinc trimellitate-zinc octoate system does not achieve the high tensile and modulus of a zinc octoate-zinc oxide or even of a zinc octoate system. The zinc trimellitate-zinc octoate system has lower physical properties than a zinc octoate system even though the zinc octoate system shows a lower maximum torque.

EXAMPLE III

Nitrile elastomer compositions were evaluated as to effect of zinc trimellitate upon cure rate and cross-link density. The following formulations shown in Table VI were used.

TaBLE VI

Nitrile Elastomer Formulations
Parts by Weight

| Sample | 74-1 | 74-2 | 74-3 | 74-4 | 74-5 |
|---|---|---|---|---|---|
| Nitrile Rubber (Hycar 1052) | 100.00 | 100.00 | 100.00 | 100.00 | 100.00 |
| Sulfur | 1.75 | 1.75 | 1.75 | 1.75 | 1.75 |
| Zinc Oxide (Actox 14) (ZnO) | 5.00 | 3.75 | 2.50 | 1.25 | — |
| Stearic Acid | 1.00 | 1.00 | 1.00 | 1.00 | 1.00 |
| Accelerator (Altax) | 1.50 | 1.50 | 1.50 | 1.50 | 1.50 |
| Methyl Tuads | 0.10 | 0.10 | 0.10 | 0.10 | 0.10 |
| Agerite Stalite S | 2.00 | 2.00 | 2.00 | 200 | 2.00 |
| Dioctyl Phthalate (DOP) | 30.00 | 30.00 | 30.00 | 30.00 | 30.00 |
| Dixie Clay | 146.60 | 146.60 | 146.60 | 146.60 | 146.60 |
| Zinc Trimellitate (ZnTm) | — | 1.25 | 2.50 | 3.75 | 5.00 |
| Ratio ZnO:ZnTm | 5.0:0 | 3.75:1.25 | 2.5:2.5 | 1.25:3.75 | 0:5.0 |

Hycar 1052 is a product of B. F. Goodrich Co., Inc. of Cleveland, Ohio. Agerite Stalite S is a solid alkylated diphenyl amine with a $C_8H_{17}$ alkyl moiety. Altax is benzothiozyldisulfide. Methyl Tuads is tetramethyl thiuran disulfide. Dixie Clay is kaolin (hard clay) with a fineness of 99.8% through 325 mesh (U.S.) screen. Agerite Stalite S, Altax, Methyl Tuads and Dixie Clay are products of R. T. Vanderbilt Co., Inc. of Norwalk, Conn.

Sample 74-1 was a control sample. It demonstrates the typical scorch time and curing time of a zinc oxide system with stearic acid and Altax accelerator.

The rubber was banded upon a coal mill with stearic acid and Agerite Stalite S. The filler was added and well-mixed, followed by the addition of dioctyl phthalate. When the composition was thoroughly mixed, zinc oxide was added until well dispersed. Sulfur, Altax and Methyl Tuads were then added. The addition and mixing of the cure system did not exceed two minutes. The composition was then removed from the mill and allowed to cool.

Samples were evaluated in a Monsanto Oscillating Rheometer 100. The data were obtained from 20 mil molded slabs. The slabs were molded at 350° F. for 45 minutes. The samples were heated to temperatures within the range of from 320° to 340° F. The time in minutes required for the viscosity of the stock to increase two units above the minimum viscosity was determined, as in the procedure of Example I, as the Scorch Resistance in minutes. The time required to reach 90% of total cure as a measure of the rate of cure was measured. Maximum rheometer torque at total cure measured cross-link efficiency. The resulting data are shown in Table VIII.

Table VIII

Cure Time and Scorch Resistance-Nitrile
Elastomers Effect of Zinc Trimellitate

| Sample | 74-1 | 74-2 | 74-3 | 74-4 | 74-5 |
|---|---|---|---|---|---|
| Cure Temperature, °F. | 320 | 320 | 320 | 320 | 330 |
| Time to 90% Cure-Minutes | 38+ | 35.5 | 20.0 | 32.75 | — |
| Time to Total Cure-Minutes | 60.0+ | 75.0 | 57.0 | 107 | 60.0+ |
| Scorch Resistance-Minutes/2 Units | 11.5 | 9.5 | 6.25 | 8.0 | 9.25 |
| lbs Torque at Total Cure | 35+ | 78.0 | 70.0 | 47.5 | 28.0+ |

Samples 74-2, 74-3 and 74-4 show the synergistic effect of zinc trimellitate with zinc oxide. Sample 74-3, a 50:50 mix of ZnTm:ZnO, indicates the greatest increase in cure rate. The substitution of zinc trimellitate for 25% of zinc oxide shows a marked increase in cure rate and cross-link density. At 100% zinc trimellitate the cure was retarded.

The samples 74-1, 74-2, 74-3, 74-4 and 74-5 so compounded and evaluated on the Monsanto Rheometer were evaluated at % modulus, tensile strength, and % elongation as shown in Table IX.

Table IX

Nitrile Elastomer Cured Properties*
Effect of Zinc Trimellitate

| Sample | 74-1 | 74-2 | 74-3 | 74-4 | 74-5 |
|---|---|---|---|---|---|
| Modulus of Elasticity in psi at 100% Modulus | 260 | 115 | 125 | 215 | 160 |
| 200% Modulus | 420 | 185 | 200 | 315 | 162 |
| 300% Modulus | 520 | 240 | 250 | 385 | 165 |
| Tensile Strength at Break, lbs/in$^3$ | 1,180 | 755 | 555 | 890 | 520 |
| Ultimate Elongation, Percent | 800 | 950 | 930 | 735 | 600 |

*Cured 45 minutes at 350° F. (177° C.)

The 45 minute cure should be a complete cure. The results of Table IX indicate that nitrile elastomer compounds with zinc trimellitate have lower modulus and tensile strength.

EXAMPLE IV

Natural rubber compositions were evaluated as to effect of zinc trimellitate upon cure rate and cross-link density. The following formulations shown in Table X were used.

TABLE X

Natural Rubber Formulations

| Sample | Parts by Weight | | | |
|---|---|---|---|---|
| | 75-1 | 75-2 | 75-3 | 75-4 |
| Natural Rubber (Goodyear SIR 10) | 150 | 150 | 150 | 150 |
| Stearic Acid | 2 | 2 | 2 | 2 |
| Zinc Oxide (Actox 14) (ZnO) | 5 | 3.75 | 2.5 | 1.25 |
| Antioxidant (Agerite Stalite) | 1 | 1 | 1 | 1 |
| Carbon Black (Statex M568) | 75 | 75 | 75 | 75 |
| Sulfur | 2.5 | 2.5 | 2.5 | 2.5 |
| Accelerator (Altax) | .5 | .5 | .5 | .5 |
| Ethyl Tuads | .5 | .5 | .5 | .5 |
| Zinc Trimellitate (ZnTm) | — | 1.25 | 2.5 | 3.75 |
| Ratio ZnO:ZnTm | 5:0 | 3.75:1.25 | 2.5:2.5 | 1.25:3.75 |

Goodyear SIR10 is a product of Goodyear Tire and Rubber Co. Inc. of Akron, Ohio. Carbon black Statex M568 is a fast extruding furnace black and is a product of Columbian Div., Cities Service Co. of New York, N.Y. Ethyl Tuads is tetraethyl thiuram disulfide and is a product of R. T. Vanderbilt Co., Inc., of Norwalk, Conn.

The SIR10, Agerite Stalite, carbon black, stearic acid and zinc oxide were mixed on a cool mill. After the ingredients were thoroughly mixed, a period of about five minutes, the sulfur, Altax and Ethyl Tuads were added and mixed in within two minutes. The stock was sheeted off, cooled and cut for molding. Physical properties were obtained from placques molded at 300° F. (149° C.) for ten minutes.

Rate of cure and scorch times were obtained on the Monsanto Rheometer 100 in the procedure of Examples I, II and III using a 3° arc for the rotor and a temperature of 290° F. (144° C.). The results are in Table XI.

TABLE XI

Cure Time and Scorch Resistance
Natural Rubber - Effect of Zinc Trimellitate

| Sample | 75-1 | 75-2 | 75-3 | 75-4 |
|---|---|---|---|---|
| Cure Temperature, °F. | 290 | 290 | 290 | 290 |
| Time To 90% Cure - Minutes | 6.25 | 10.9 | 11.3 | 8.3 |
| Time to Total Cure - Minutes | 10 | 17.5 | 21.9 | 12 |
| Scorch Resistance Minutes/2 Units | 3.9 | 5.2 | 5.0 | 4.7 |
| lbs. Torque at Total Cure | 71.5 | 50.5 | 63.0 | 60.8 |

The use of zinc trimellitate retards the cure. It takes longer to initiate the cure and the rate of cure is decreased. The maximum torque is decreased.

The samples were evaluated as to modulus, tensile strength, and percent elongation as shown in Table XII.

TABLE XII

Natural Rubber Cured Properties
Effect of Zinc Trimellitate

| Sample | 75-1 | 75-2 | 75-3 | 75-4 |
|---|---|---|---|---|
| Modulus of Elasticity in psi at | | | | |
| 100% Modulus | 290 | 210 | 205 | 210 |
| 200% Modulus | 920 | 525 | 575 | 475 |
| 300% Modulus | 1700 | 1035 | 1140 | 820 |
| Tensile Strength at Break, lbs/in$^3$ | 2160 | 1215 | 1660 | 1040 |
| Ultimate Elongation, Percent | 375 | 375 | 385 | 365 |

The use of zinc trimellitate affects the cure of natural rubber as is shown by the physical properties in Table XII. Less cross-linking occurs with use of zinc trimellitate. The modulus at 100, 200 and 300% and tensile strength are less than the values of the sample 75-1 wherein zinc trimellitate was not used. The elongation did not show any appreciable change.

What is claimed is:

1. A composition comprising a sulfur vulcanizable rubber, sulfur, zinc oxide as an activator and at least a sufficient amount of zinc trimellitate to improve control of scorch and the cure rate.

2. The composition of claim 1 wherein the said elastomer is selected from the group consisting of styrene-butadiene rubber, nitrile rubber, and natural rubber.

3. The composition of claim 1 wherein the weight ratio of zinc trimellitate to zinc oxide is within the range of 1:19 to 19:1 and the total concentration of zinc oxide and zinc trimellitate ranges from 2 to 10 parts by weight per 100 parts by weight rubber.

4. The composition of claim 1 wherein the weight ratio of zinc trimellitate to zinc oxide is within the range of 1:3 to 3:1.

5. The composition of claim 1 wherein the said composition is vulcanized by a vulcanization process which comprises mixing the said composition on a mill for a time sufficient to achieve smoothness, adding zinc oxide and zinc trimellitate, and curing the resulting composition at a temperature within the range of from about 250° F. to 350° F. for a period sufficient for a complete cure and to obtain a vulcanized composition.

6. The composition of claim 5 wherein the said elastomer is selected from the group consisting of styrene-butadiene rubber, nitrile rubber and natural rubber.

7. The composition of claim 5 wherein the amount of zinc trimellitate is within the range of 1:3 to 3:1 by weight zinc trimellitate to zinc oxide.

8. The vulcanized composition of claim 5 comprising a sulfur-vulcanized elastomer, sulfur, zinc oxide as an activator, and at least a sufficient amount of zinc trimellitate to improve control of scorch and the cure rate.

9. The composition of claim 8 wherein the said elastomer is selected from the group consisting of styrene-butadiene rubber, nitrile rubber, and natural rubber.

10. The composition of claim 8 wherein the amount of zinc trimellitate is within the range of 1:3 to 3:1 by weight zinc trimellitate to zinc oxide.

* * * * *

UNITED STATES PATENT AND TRADEMARK OFFICE
CERTIFICATE OF CORRECTION

PATENT NO. : 4,154,720
DATED : May 15, 1979
INVENTOR(S) : Alfred P. Wilson

It is certified that error appears in the above—identified patent and that said Letters Patent is hereby corrected as shown below:

Column 2, line 62, "contrl" should read -- control --.

Column 3, line 53, "trimllitate" should read -- trimellitate --.

Column 8, line 6, "coal" should read -- cool --.

Signed and Sealed this

Eighth Day of July 1980

[SEAL]

Attest:

SIDNEY A. DIAMOND

Attesting Officer

Commissioner of Patents and Trademarks